Oct. 20, 1959 W. A. ADCOCK 2,909,715

BASE CONTACTS FOR TRANSISTORS

Filed May 23, 1955

INVENTOR

Willis A. Adcock

BY Stevens, Davis, Miller and Mosher

ATTORNEYS

United States Patent Office 2,909,715

Patented Oct. 20, 1959

2,909,715

BASE CONTACTS FOR TRANSISTORS

Willis A. Adcock, Dallas, Tex., assignor to Texas Instruments Incorporated, Dallas, Tex., a corporation of Delaware Application May 23, 1955, Serial No. 510,458

24 Claims. (Cl. 317—236)

This invention relates to transistors and a method of making them, and is particularly concerned with the electrical connection to the intermediate or base layer of the transistor and the method by which this connection is accomplished.

A typical silicon transistor element consists of two relatively thick layers of silicon having an n-type conductivity separated by a layer of silicon having a p-type conductivity and a thickness of about 0.001 inch. It has heretofore been the practice to make an electrical connection to the base or p layer of the transistor element by simply putting the end of an aluminum wire against an edge of this base or p layer, and fusing it into position so that it makes an ohmic contact to the p layer. Since the p layer is so thin, the aluminum wire will also touch the n layers on either side of it, and, in the fusion, the end of the wire even spreads beyond its normal width and forms a small ball of aluminum that spans the p layer and touches the n layers on either side. The aluminum, however, entering into an alloy state with the adjacent silicon in the two n layers, converts a portion of this n-type silicon to p-type silicon, and thus forms a guard or intermediate layer of p-type material, between the end of the aluminum wire and the n-type outer layers of silicon.

With normal bias voltages applied to the n-p-n transistor, the emitter is negative with respect to the base layer and the aluminum wire. Although under these conditions the base-emitter diode is biased in the forward direction and substantial current flows from the base layer to the emitter, only a very small current flows directly from the aluminum dot to the emitter because the region immediately surrounding the aluminum dot has a very low resistivity. However, when it is desired to stop the flow of current from the base layer to the emitter quickly, the emitter is made positive with respect to the base layer and the aluminum wire. The base-emitter diode is then biased in the reverse direction and acts as a rectifier. Because of the low resistivity of the region immediately around the aluminum dot, the breakdown voltage of this region is much lower than the other portions of the base-emitter diode. Thus, substantial amounts of undesirable reverse currents may flow from the emitter region to the aluminum dot and wire.

In addition to this, there is a considerable electrical capacitance between the relatively large aluminum dot and the two n layers of the semiconductor segment. This tends to pass high-frequency current, and thus limit the frequency range at which the transistor may be used.

Although the prior art has been discussed with reference to the formation of silicon transistors of the n-p-n type and the making of the connection to the p layer by use of an aluminum wire, it will at once be apparent that the same principles apply to the making of germanium transistors and p-n-p type transistors, and to the attaching of a terminal to the intermediate layer by fusing into that layer a wire of some other material; one of those materials having an effect analogous to that of aluminum in the case of n-p-n type transistors; and a material having the opposite effect in the case of a p-n-p type transistor. The metals that have this effect are well known to the art.

The purpose of the present invention is to provide a method of making connections to the intermediate layer of a grown junction semiconductor segment, such as is commonly used in transistors, which avoids direct contact of the base lead material with the emitter region and thus eliminates the region of low resistivity created by such contact and the resulting disadvantages of low reverse voltage breakdown and severely limited frequency response due to the excessive capacity between the connection and the emitter and collector regions.

Briefly, the method of this invention comprises forming a sharp point on the end of a metal wire that is relatively hard and of relatively high melting point, coating that point with a thin coating of a metal of relatively low melting point, pressing the coated point against the intermediate layer of a semiconductor segment that is to be used as a part of the transistor, and then fusing the coating so as to bind the point to the intermediate layer.

The metal of which the sharp point is made may be tungsten or any other relatively hard and relatively high melting point metal. Preferably, the point of the wire is sharpened by electrolytic etching so that it will be quite sharp and quite clean. Thereafter it is coated with aluminum, or some other metal that melts at a relatively low temperature, by evaporation of that metal in a vacuum adjacent the point. Vacuum sputtering may be used for this coating operation, but vacuum evaporation is generally preferred. In general, if the point is to make contact with a p-type intermediate layer, aluminum is the preferred coating metal, and if the point is to make contact with an n-type intermediate layer, a gold-antimony alloy containing about one to two percent by weight is preferable. Only a very thin layer of the softer metal is necessary, and generally, a layer of from about one ten-thousandths of an inch to a few ten-thousandths of an inch will be sufficient for the purposes of this invention.

Once the point has been coated, the intermediate layer of the transistor is carefully located, either by etching and observation under a microscope or by electrical means, and the point of the hard wire is then forced against the intermediate layer as near its mid-point as possible. The point of contact is then heated, either by passing an electrical current therethrough or by heating the hard metal wire and allowing it to conduct heat to the point of contact, until the softer coating metal fuses to the intermediate layer of the semiconductor. This completes the connection. When the connection is made properly, contact is made only with the intermediate layer, and the outer layers are not affected at all, so there is no tendency for current to pass directly from the connection to the emitter, nor is there any appreciable capacity created between the connection and the outer layers of the semiconductor.

This invention lends itself particularly well to the manufacture of silicon n-p-n type transistors which will withstand a high emitter-to-base voltage without breakdown, and it also lends itself well to the manufacture of tetrode transistors in which two or more contacts are made to the intermediate layer. By using a gold-antimony alloy as the coating on the sharp-pointed tungsten contact, it is entirely feasible to manufacture p-n-p type silicon transistors having similar advantages.

Further details and advantages of this invention will be apparent from a consideration of the appended drawings and the following detailed description of the embodiments shown therein. In the drawings.

Figure 1:
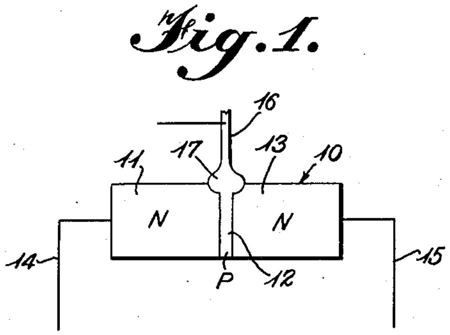
Figure 1 is a diagrammatic illustration of the operative parts of a transistor formed in accordance with the prior art.

As illustrated in Figure 1, the operative parts of a grown junction transistor of known type may consist of a section 10 cut from a silicon crystal that has been grown so that it has an emitter portion 11 of n-type conductivity and an intermediate, very thin layer 12 of p-type conductivity and a collector portion 13 of n-type conductivity. The usual size for such a semiconductor segment as the one generally designated as 10 is about 0.030 by 0.030 by 0.250 inch, and the p layer is usually in the neighborhood of 0.001 inch in thickness. To the emitter section 11 an ohmic connection 14 may be affixed in any desired manner and, similarly, an ohmic connection 15 may be affixed in any desired manner to the collector section 13.

It is common practice in the prior art to make the connection to the p layer 12 by simply bringing the end of an aluminum wire 16 against the surface of the semiconductor segment at the p layer 12 and fusing the end of the aluminum wire 16 so that it forms a small enlarged portion 17, which fuses itself to the p layer 12 and also to the adjoining portions of the emitter section 11 and the collector section 13, which are of n-type conductivity. In this fusion, enough aluminum alloys itself with the silicon in the end sections to convert the adjacent portions of the end sections to p-type conductivity, thus forming a junction or barrier layer that helps to prevent a direct short-circuiting of the aluminum wire 16 to these layers. As has been previously pointed out, this arrangement is not entirely satisfactory because when the base layer and aluminum wire are made negative with respect to the emitter portion of the crystal, the breakdown voltage is too low to be entirely satisfactory. Furthermore, the capacity between the enlarged portion 17 at the end of the aluminum wire 16 and the two end portions of the semiconductor segment is too high for the device to be satisfactory for very high frequencies, and this limits the usefulness of the device.

Figure 2:
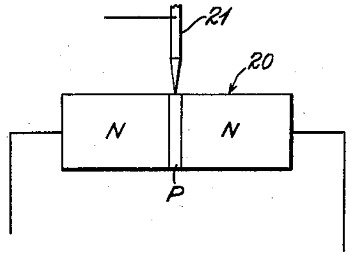
Figure 2 is a diagrammatic illustration of a similar transistor, but formed in accordance with the principles of this invention.
Figure 3:
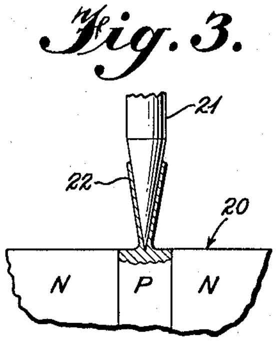
Figure 3 is a diagrammatic illustration of a small part of the transistor of Figure 2 on a greatly enlarged scale to show the construction more clearly.

Passing now to Figures 2 and 3, we find illustrated therein a device similar to Figure 1, except that it has been altered to incorporate the principles of this invention. Thus, there is illustrated in Figures 2 and 3 an n-p-n semiconductor segment 20, which may be a segment cut from a silicon crystal so grown that it contains a thin layer of p-type conductivity of the order of 0.001 inch in thickness. The connection has been made to this p layer by means of a pointed tungsten wire 21 coated with a thin coating 22 of aluminum, as can be seen more plainly in Figure 3, and the point of the tungsten wire 21 has been placed in contact with the p layer of the semiconductor segment 20, as near the center of the p layer as possible. Subsequent to the placing of the point 21 on the p layer, the aluminum coating 22 has been fused into the p layer to complete the contact.

While tungsten is the preferred metal from which to make the pointed connection 21, it may be made from any other relatively hard, high-melting-point metal wire which can be etched, ground or otherwise shaped to a sharp point. Preferably, the point is formed by etching the wire electrolytically in an etching solution consisting of sodium hydroxide, potassium hydroxide or other suitable etching solution.

Subsequent to its formation, the point is covered by a thin coating of a metal melting at a lower temperature than the metal of which the point is comprised, and one which will not affect the conductivity type of the intermediate layer. In the illustrated case, the intermediate layer being of the p-type, aluminum has been found to be a very satisfactory coating material, although gallium, indium, boron and thallium may be used. When the contact is to be made with an n-type intermediate layer, antimony, arsenic or bismuth may be used. Alloys containing these materials may also be used, and in the case of an n-type intermediate layer, an alloy of gold and antimony containing about one or two percent antimony has been found particularly useful.

The plating is preferably accomplished by evaporating the material to be plated in close proximity to the wire, and in a very high vacuum. By this means, a thin coating is obtained, which is evenly adhered to the wire. Preferably, the coating is about one ten-thousandths of an inch thick, and it generally need not be more than a few ten-thousandths of an inch thick.

The wire so coated is carefully positioned as near the center of the intermediate layer as possible. The connection is then completed by fusing the coating into the intermediate layer either by passing an electrical current through the connection or by heating the hard metal wire and allowing the heat to pass by conduction to the point of contact, where it melts the soft outer coating.

Although the present invention has been described using point contact connections to the base layer of the silicon segment, it is to be understood that the principles of the method disclosed herein are equally applicable to an elongated small area base contact or blade which may extend across a portion or even the entire width of one surface of the junction. Such a knife-edge contact would be electrolytically etched to produce an extremely sharp edge. The process of vacuum evaporation is then used to produce a very thin coating of aluminum or other suitable material on the knife-edge. As with the point contact, the coated knife-edge contact is carefully positioned as near the center of the intermediate layer as possible and the connection is completed by fusing the coating into the intermediate layer by the application of either an electrical current or heat.

What is claimed is:

1. A method of forming an ohmic electrical contact to the thin intermediate layer of a semiconductor segment that contains at least two closely adjacent junctions enclosing such a thin intermediate layer between them, said method comprising the steps of forming a sharp point on the end of a metal wire, coating the point with a metal of lower melting point than the wire that will not tend to change the conductivity type of the intermediate layer upon fusion therewith, bringing the coated point into contact with the said intermediate layer and fusing the coating to bind together the point and intermediate layer only.

2. A method as defined in claim 1 in which the metal wire is tungsten.

3. A method as defined in claim 1 in which the metal wire is tungsten and the coating metal is aluminum.

4. A method as defined in claim 1 in which the metal wire is tungsten and the coating metal is a gold-antimony alloy in which antimony is present in a proportion of about one to two percent.

5. A method as defined in claim 1 in which the metal wire is coated in a vacuum by a heated metal of lower melting point.

6. A method as defined in claim 1 in which the point of the metal wire is coated by vaporization of a metal of lower melting point adjacent the point of the metal wire and in a high vacuum.

7. A device of the type described that comprises a semiconductor segment consisting of at least three transversely extending layers, the intermediate layer of which is relatively thin, a sharp-pointed metal wire coated with a metal of lower melting point and having the point in contact with the intermediate layer of the semiconductor material, the coating metal being fused only with the intermediate layer of the semiconductor material.

8. A device as defined in claim 7 in which the intermediate layer is of p-type conductivity, the metal wire is of tungsten and the coating material is aluminum.

9. A device as defined in claim 7 in which the intermediate layer is of p-type conductivity and the coating metal is of a type that will not change the conductivity type of the intermediate layer.

10. A device as defined in claim 7 in which the intermediate layer is of n-type conductivity and the coating metal is of a type that will not affect the conductivity type of the intermediate layer.

11. A device of the type defined in claim 7 in which the intermediate layer is of n-type conductivity and the coating metal is a gold-antimony alloy containing around one to two percent antimony.

12. A method of forming an ohmic electrical contact to the thin intermediate layer of a semiconductor segment that contains at least two closely adjacent junctions enclosing such a thin intermediate layer between them, said method comprising the steps of forming a sharp edge on a metal blade, coating the edge with a metal of lower melting point than the blade that will not tend to change the conductivity type of the intermediate layer upon fusion therewith, bringing the coated edge into contact with the said intermediate layer and fusing the coating to bind the edge and intermediate layer together.

13. A method as defined in claim 12 in which the metal blade is tungsten.

14. A method as defined in claim 12 in which the metal blade is tungsten and the coating metal is aluminum.

15. A method as defined in claim 12 in which the metal blade is tungsten and the coating metal is a gold-antimony alloy in which antimony is present in the proportion of about one to two percent.

16. A method as defined in claim 12 in which the metal blade is coated in a vacuum by a heated metal of lower melting point.

17. A method as defined in claim 12 in which the edge of the metal blade is coated by vaporization of a metal of lower melting point adjacent the edge of the metal blade and in a high vacuum.

18. A device of the type described that comprises a semiconductor segment consisting of at least three transversely extending layers, the intermediate layer of which is relatively thin, a sharp edged metal blade coated with a metal of lower melting point and having the edge in contact with the intermediate layer of the semiconductor material, the coating metal being fused with the intermediate layer of the semiconductor material.

19. A device as defined in claim 18 in which the intermediate layer is of p-type conductivity, the metal blade is of tungsten and the coating material is aluminum.

20. A device as defined in claim 18 in which the intermediate layer is of p-type conductivity and the coating metal is of a type that will not change the conductivity type of the intermediate layer.

21. A device as defined in claim 18 in which the intermediate layer is of n-type conductivity and the coating metal is of a type that will not affect the conductivity type of the intermediate layer.

22. A device of the type defined in claim 18 in which the intermediate layer is of n-type conductivity and the coating metal is a gold-antimony alloy containing around one to two percent antimony.

23. A method of forming an ohmic electrical contact to the thin intermediate layer of a semiconductor segment that contains at least two closely adjacent junctions enclosing such a thin intermediate layer between them, said method comprising the steps of forming a metal electrode with a sharp end, coating the sharp end and the immediately surrounding area of said electrode with a metal of a lower melting point than the metal of said electrode that will not tend to change the conductivity type of the intermediate layer upon fusion therewith, bringing the coated sharp end into contact with the said intermediate layer and fusing the coating to bind together the sharp end and the intermediate layer only.

24. A device of the type described that comprises a semiconductor segment consisting of at least three transversely extending layers, the intermediate layer of which is relatively thin, a metal electrode having a sharp end and having a coating of metal having a lower melting point than the metal of said electrode and having the sharp end in contact with the intermediate layer of the semiconductor material, the coating metal being fused with the intermediate layer only of the semiconductor material.

References Cited in the file of this patent

UNITED STATES PATENTS

| | | |
|---|---|---|
| 2,603,693 | Kircher | July 15, 1952 |
| 2,603,694 | Kircher | July 15, 1952 |
| 2,654,059 | Shockley | Sept. 29, 1953 |
| 2,671,156 | Douglas et al. | Mar. 2, 1954 |
| 2,697,269 | Fuller | Dec. 21, 1954 |
| 2,705,767 | Hall | Apr. 5, 1955 |
| 2,721,965 | Hall | Oct. 25, 1955 |
| 2,735,050 | Armstrong | Feb. 14, 1956 |
| 2,748,235 | Wallace | May 29, 1956 |